(12) United States Patent
Matsui et al.

(10) Patent No.: US 7,991,291 B2
(45) Date of Patent: Aug. 2, 2011

(54) WDM PON BASED ON DML

(75) Inventors: Yasuhiro Matsui, Woburn, MA (US); Kevin McCallion, Charlestown, MA (US)

(73) Assignee: Finisar Corporation, Sunnyvale, CA (US)

( * ) Notice: Subject to any disclaimer, the term of this patent is extended or adjusted under 35 U.S.C. 154(b) by 715 days.

(21) Appl. No.: 12/028,675

(22) Filed: Feb. 8, 2008

(65) Prior Publication Data

US 2008/0193132 A1 Aug. 14, 2008

Related U.S. Application Data (60) Provisional application No. 60/900,383, filed on Feb. 8, 2007.

(51) Int. Cl.
*H04B 10/04* (2006.01)
*H04B 10/00* (2006.01)
*H04J 14/02* (2006.01)
*H04J 14/00* (2006.01)

(52) U.S. Cl. ............ 398/91; 398/71; 398/157; 398/199; 398/200

(58) Field of Classification Search ............ 398/27, 398/31–34, 38, 82, 91–95, 142–144, 147–149, 398/154, 157, 158, 195, 196, 200
See application file for complete search history.

(56) References Cited

U.S. PATENT DOCUMENTS

| | | |
|---|---|---|
| 3,324,295 A | 6/1967 | Harris |
| 3,973,216 A | 8/1976 | Hughes et al. |
| 3,999,105 A | 12/1976 | Archey et al. |
| 4,038,600 A | 7/1977 | Thomas et al. |
| 4,561,119 A | 12/1985 | Epworth |
| 4,671,604 A | 6/1987 | Soref |
| 4,754,459 A | 6/1988 | Westbrook |
| 4,805,235 A | 2/1989 | Henmi |
| 4,841,519 A | 6/1989 | Nishio |
| 4,896,325 A | 1/1990 | Coldren |

(Continued)

FOREIGN PATENT DOCUMENTS

CN 1236891 12/1999

(Continued)

OTHER PUBLICATIONS

Dong Jae Shin, et al., Low-Cost WDM-PON With Colorless Bidirectional Transceivers, Journal of Lightwave Technology, Jan. 2006, pp. 158-165, vol. 24, No. 1.

(Continued)

*Primary Examiner* — Dalzid Singh
(74) *Attorney, Agent, or Firm* — Maschoff Gilmore & Israelsen (57) ABSTRACT

Low-cost FP lasers can be implemented in the upstream links of a WDM PON system by configuring them for single-mode operation. In a typical embodiment, an FP laser at a subscriber unit is injection seeded with CW seed light from a DFB laser or an ASE source at a central office to enable single-mode operation of the FP laser. The FP laser is directly modulated and the resulting optical data signal is transmitted upstream to the central office. At the central office, an optical spectrum reshaper/bandpass optical filter is positioned in front of an optical receiver to enhance the extinction ratio of the optical data signal and generate a vestigial sideband. A wavelength locker can also be implemented at the central office to stabilize the wavelength of the master DFB laser and the injection-seeded FP laser.

20 Claims, 4 Drawing Sheets

U.S. PATENT DOCUMENTS

| | | | |
|---|---|---|---|
| 4,908,833 A | 3/1990 | Chraplyvy et al. |
| 4,914,667 A | 4/1990 | Blonder et al. |
| 5,088,097 A | 2/1992 | Ono et al. |
| 5,119,393 A | 6/1992 | Oka et al. |
| 5,136,598 A | 8/1992 | Weller et al. |
| 5,170,402 A | 12/1992 | Ogita et al. |
| 5,177,630 A | 1/1993 | Goutzoulis et al. |
| 5,293,545 A | 3/1994 | Huber |
| 5,325,378 A | 6/1994 | Zorabedian |
| 5,325,382 A | 6/1994 | Emura et al. |
| 5,371,625 A | 12/1994 | Wedding et al. |
| 5,394,429 A | 2/1995 | Yamada et al. |
| 5,412,474 A | 5/1995 | Reasenberg |
| 5,416,629 A | 5/1995 | Huber |
| 5,434,693 A | 7/1995 | Tanaka et al. |
| 5,450,432 A | 9/1995 | Okuda |
| 5,459,799 A | 10/1995 | Weber |
| 5,465,264 A | 11/1995 | Buhler et al. |
| 5,477,368 A | 12/1995 | Eskildsen et al. |
| 5,550,667 A | 8/1996 | Krimmel et al. |
| 5,568,311 A | 10/1996 | Matsumoto |
| 5,592,327 A | 1/1997 | Gabl et al. |
| 5,642,371 A | 6/1997 | Tohyama et al. |
| 5,696,859 A | 12/1997 | Onaka et al. |
| 5,737,104 A | 4/1998 | Lee et al. |
| 5,777,773 A | 7/1998 | Epworth et al. |
| 5,805,235 A | 9/1998 | Bedard |
| 5,856,980 A | 1/1999 | Doyle |
| 5,920,416 A | 7/1999 | Beylat et al. |
| 5,946,129 A | 8/1999 | Xu et al. |
| 5,953,139 A | 9/1999 | Nemecek et al. |
| 5,953,361 A | 9/1999 | Borchert |
| 5,974,209 A | 10/1999 | Cho et al. |
| 5,991,323 A | 11/1999 | Adams et al. |
| 6,018,275 A | 1/2000 | Perrett et al. |
| 6,081,361 A | 6/2000 | Adams et al. |
| 6,088,373 A | 7/2000 | Hakki |
| 6,091,743 A | 7/2000 | Yang |
| 6,096,496 A | 8/2000 | Frankel |
| 6,104,851 A | 8/2000 | Mahgerefteh |
| 6,115,403 A | 9/2000 | Brenner et al. |
| 6,148,017 A | 11/2000 | Borchert et al. |
| 6,157,025 A | 12/2000 | Katagiri et al. |
| 6,188,499 B1 | 2/2001 | Majima |
| 6,222,861 B1 | 4/2001 | Kuo et al. |
| 6,271,959 B1 | 8/2001 | Kim et al. |
| 6,282,003 B1 | 8/2001 | Logan et al. |
| 6,298,186 B1 | 10/2001 | He |
| 6,331,991 B1 | 12/2001 | Mahgerefteh |
| 6,351,585 B1 | 2/2002 | Amundson et al. |
| 6,353,623 B1 | 3/2002 | Munks et al. |
| 6,359,716 B1 | 3/2002 | Taylor |
| 6,421,151 B1 | 7/2002 | Berger |
| 6,459,518 B1 | 10/2002 | Suzuki et al. |
| 6,473,214 B1 | 10/2002 | Roberts et al. |
| 6,486,440 B1 | 11/2002 | Crafts et al. |
| 6,506,342 B1 | 1/2003 | Frankel |
| 6,522,809 B1 | 2/2003 | Takabayashi et al. |
| 6,563,623 B1 | 5/2003 | Penninckx et al. |
| 6,577,013 B1 | 6/2003 | Glenn et al. |
| 6,580,739 B1 | 6/2003 | Coldren |
| 6,618,513 B2 | 9/2003 | Evankow, Jr. |
| 6,628,690 B1 | 9/2003 | Fish et al. |
| 6,650,667 B2 | 11/2003 | Nasu et al. |
| 6,654,564 B1 | 11/2003 | Colbourne et al. |
| 6,658,031 B2 | 12/2003 | Tuganov et al. |
| 6,665,351 B2 | 12/2003 | Hedberg et al. |
| 6,687,278 B1 | 2/2004 | Mason et al. |
| 6,690,686 B2 | 2/2004 | Delfyett |
| 6,738,398 B2 | 5/2004 | Hirata |
| 6,748,133 B2 | 6/2004 | Liu et al. |
| 6,778,307 B2 | 8/2004 | Clark |
| 6,785,308 B2 | 8/2004 | Dyer et al. |
| 6,807,215 B2 | 10/2004 | Lam et al. |
| 6,810,047 B2 | 10/2004 | Oh et al. |
| 6,815,786 B2 | 11/2004 | Ogasawara et al. |
| 6,834,134 B2 | 12/2004 | Brennan et al. |
| 6,836,487 B1 | 12/2004 | Farmer et al. |
| 6,847,758 B1 | 1/2005 | Watanabe |
| 6,943,951 B2 | 9/2005 | Kikuchi et al. |
| 6,947,206 B2 | 9/2005 | Tsadka et al. |
| 6,963,685 B2 | 11/2005 | Mahgerefteh et al. |
| 7,013,090 B2 | 3/2006 | Adachi et al. |
| 7,027,470 B2 | 4/2006 | May |
| 7,054,538 B2 | 5/2006 | Mahgerefteh et al. |
| 7,073,956 B1 * | 7/2006 | Shin et al. ........................ 385/89 |
| 7,076,170 B2 | 7/2006 | Choa |
| 7,123,846 B2 | 10/2006 | Tateyama et al. |
| 7,164,865 B2 | 1/2007 | Tatsuno et al. |
| 7,187,821 B2 | 3/2007 | Matsui et al. |
| 7,263,291 B2 | 8/2007 | Mahgerefteh et al. |
| 7,280,721 B2 | 10/2007 | McCallion et al. |
| 7,352,968 B2 | 4/2008 | Tayebati |
| 7,356,264 B2 | 4/2008 | Mahgerefteh et al. |
| 7,376,352 B2 | 5/2008 | Tayebati |
| 7,406,266 B2 | 7/2008 | Mahgerefteh et al. |
| 7,406,267 B2 | 7/2008 | Mahgerefteh et al. |
| 7,433,605 B2 | 10/2008 | Mahgerefteh et al. |
| 7,474,858 B2 | 1/2009 | Lee et al. |
| 7,474,859 B2 | 1/2009 | Mahgerefteh et al. |
| 7,477,851 B2 | 1/2009 | Mahgerefteh et al. |
| 7,480,464 B2 | 1/2009 | McCallion et al. |
| 7,492,976 B2 | 2/2009 | Mahgerefteh et al. |
| 7,502,532 B2 | 3/2009 | McCallion et al. |
| 7,505,694 B2 | 3/2009 | Johnson et al. |
| 7,515,626 B2 * | 4/2009 | Lee et al. ........................ 372/71 |
| 7,536,113 B2 | 5/2009 | Matsui et al. |
| 7,542,683 B2 | 6/2009 | Matsui et al. |
| 7,555,225 B2 | 6/2009 | Mahgerefteh et al. |
| 7,558,488 B2 | 7/2009 | Matsui et al. |
| 7,564,889 B2 | 7/2009 | Matsui et al. |
| 7,609,977 B2 | 10/2009 | Matsui et al. |
| 7,613,401 B2 | 11/2009 | Matsui et al. |
| 7,616,902 B2 | 11/2009 | Mahgerefteh et al. |
| 7,630,425 B2 | 12/2009 | Tayebati et al. |
| 7,639,955 B2 | 12/2009 | Zheng et al. |
| 7,657,179 B2 | 2/2010 | Mahgerefteh et al. |
| 7,663,762 B2 | 2/2010 | Mahgerefteh et al. |
| 7,697,186 B2 | 4/2010 | McCallion et al. |
| 7,697,847 B2 | 4/2010 | Matsui et al. |
| 7,742,542 B2 | 6/2010 | Mahgerefteh et al. |
| 7,760,777 B2 | 7/2010 | Matsui et al. |
| 7,778,295 B2 | 8/2010 | Matsui et al. |
| 7,809,280 B2 | 10/2010 | Mahgerefteh et al. |
| 7,860,404 B2 | 12/2010 | Matsui et al. |
| 2001/0012430 A1 | 8/2001 | Usami et al. |
| 2001/0048705 A1 | 12/2001 | Kitaoka et al. |
| 2002/0012369 A1 | 1/2002 | Nasu et al. |
| 2002/0044738 A1 | 4/2002 | Jablonski |
| 2002/0048290 A1 | 4/2002 | Tanaka et al. |
| 2002/0063930 A1 | 5/2002 | Blauvelt |
| 2002/0131047 A1 | 9/2002 | Zarrabian et al. |
| 2002/0154372 A1 | 10/2002 | Chung et al. |
| 2002/0159490 A1 | 10/2002 | Karwacki |
| 2002/0176659 A1 | 11/2002 | Lei et al. |
| 2003/0002099 A1 | 1/2003 | Sayyah et al. |
| 2003/0002120 A1 | 1/2003 | Choa |
| 2003/0063647 A1 | 4/2003 | Yoshida et al. |
| 2003/0067952 A1 | 4/2003 | Tsukiji et al. |
| 2003/0077031 A1 | 4/2003 | Zhang et al. |
| 2003/0099018 A1 | 5/2003 | Singh et al. |
| 2003/0147114 A1 | 8/2003 | Kang et al. |
| 2003/0161370 A1 | 8/2003 | Buimovich et al. |
| 2003/0169787 A1 | 9/2003 | Vergaftman et al. |
| 2003/0193974 A1 | 10/2003 | Frankel et al. |
| 2003/0210912 A1 | 11/2003 | Leuthold |
| 2004/0008933 A1 | 1/2004 | Mahgerefteh et al. |
| 2004/0008937 A1 | 1/2004 | Mahgerefteh et al. |
| 2004/0036943 A1 | 2/2004 | Freund et al. |
| 2004/0076199 A1 | 4/2004 | Wipiejewski et al. |
| 2004/0081386 A1 | 4/2004 | Morse et al. |
| 2004/0086012 A1 | 5/2004 | Kitaoka et al. |
| 2004/0096221 A1 | 5/2004 | Mahgerefteh et al. |
| 2004/0218890 A1 | 11/2004 | Mahgerefteh et al. |
| 2004/0234200 A1 | 11/2004 | Jennings et al. |
| 2005/0100345 A1 | 5/2005 | Welch et al. |
| 2005/0111852 A1 | 5/2005 | Mahgerefteh et al. |

| | | | |
|---|---|---|---|
| 2005/0152702 | A1 | 7/2005 | Mahgerefteh et al. |
| 2005/0163512 | A1 | 7/2005 | Tayebati et al. |
| 2005/0169638 | A1 | 8/2005 | Tayebati et al. |
| 2005/0169642 | A1 | 8/2005 | Mahgerefteh et al. |
| 2005/0175356 | A1 | 8/2005 | McCallion et al. |
| 2005/0196177 | A1 | 9/2005 | Moran |
| 2005/0206989 | A1 | 9/2005 | Marsh |
| 2005/0213993 | A1 | 9/2005 | Kazemi-Nia et al. |
| 2005/0249509 | A1 | 11/2005 | Nagarajan et al. |
| 2005/0271394 | A1 | 12/2005 | Whiteaway et al. |
| 2005/0286829 | A1 | 12/2005 | Mahgerefteh et al. |
| 2005/0286909 | A1 | 12/2005 | Kish et al. |
| 2006/0002718 | A1 | 1/2006 | Matsui et al. |
| 2006/0008272 | A1 | 1/2006 | Abeles et al. |
| 2006/0018666 | A1 | 1/2006 | Matsui et al. |
| 2006/0029358 | A1 | 2/2006 | Mahgerefteh et al. |
| 2006/0029396 | A1 | 2/2006 | Mahgerefteh et al. |
| 2006/0029397 | A1 | 2/2006 | Mahgerefteh et al. |
| 2006/0078338 | A1 | 4/2006 | Johnson et al. |
| 2006/0120416 | A1 | 6/2006 | Hu et al. |
| 2006/0193636 | A1 | 8/2006 | Katagiri et al. |
| 2006/0228120 | A9 | 10/2006 | McCallion et al. |
| 2006/0233556 | A1 | 10/2006 | Mahgerefteh et al. |
| 2006/0239306 | A1 | 10/2006 | Donanhoe et al. |
| 2006/0274993 | A1 | 12/2006 | Mahgerefteh et al. |
| 2007/0286608 | A1 | 12/2007 | Matsui et al. |
| 2008/0002990 | A1 | 1/2008 | McCallion et al. |
| 2008/0037608 | A1 | 2/2008 | Zhou et al. |
| 2008/0159747 | A1 | 7/2008 | Mahgerefteh et al. |
| 2008/0166134 | A1 | 7/2008 | McCallion et al. |
| 2008/0181619 | A1 | 7/2008 | Heismann |
| 2008/0187325 | A1 | 8/2008 | McCallion et al. |
| 2008/0193132 | A1 | 8/2008 | Matsui et al. |
| 2008/0193144 | A1 | 8/2008 | Zhou et al. |
| 2008/0240180 | A1 | 10/2008 | Matsui et al. |
| 2008/0247763 | A1 | 10/2008 | Mahgerefteh et al. |
| 2008/0247765 | A1 | 10/2008 | Mahgerefteh et al. |
| 2008/0291950 | A1 | 11/2008 | McCallion et al. |
| 2009/0003842 | A1 | 1/2009 | Mahgerefteh et al. |
| 2009/0060526 | A1 | 3/2009 | Matsui et al. |
| 2009/0080905 | A1 | 3/2009 | Olsson et al. |
| 2009/0196631 | A1 | 8/2009 | Daghighian et al. |
| 2009/0238224 | A1 | 9/2009 | Ye |
| 2009/0269069 | A1 | 10/2009 | Mahgerefteh et al. |
| 2010/0008679 | A1 | 1/2010 | Cole |
| 2010/0098436 | A1 | 4/2010 | Mahgerefteh et al. |
| 2010/0279447 | A1 | 11/2010 | Matsui et al. |
| 2010/0311195 | A1 | 12/2010 | Matsui et al. |

FOREIGN PATENT DOCUMENTS

| | | |
|---|---|---|
| CN | 200580037807 | 5/2010 |
| EP | 0524758 | 7/1992 |
| EP | 602659 | 6/1994 |
| EP | 05764209.2 | 6/2009 |
| GB | 2 107 147 | 4/1983 |
| GB | 2107147 | 4/1983 |
| JP | 58-075340 | 5/1983 |
| JP | 62-189832 | 8/1987 |
| JP | 09-214427 | 8/1997 |
| JP | 11-031859 | 2/1999 |
| JP | 2000105313 | 4/2000 |
| JP | 2001-036477 | 2/2001 |
| JP | 2001-284711 | 10/2001 |
| JP | 2001291928 | 10/2001 |
| JP | 2001320328 | 11/2001 |
| JP | 2002243935 | 8/2002 |
| JP | 2002267834 | 9/2002 |
| JP | 2002267998 | 9/2002 |
| JP | 2002-311235 | 10/2002 |
| WO | WO 9905804 | 2/1999 |
| WO | WO9905804 | 2/1999 |
| WO | WO0104999 | 1/2001 |
| WO | WO 0104999 | 1/2001 |
| WO | WO 0117076 | 3/2001 |
| WO | WO 0118919 | 3/2001 |
| WO | WO 03005512 | 7/2002 |
| WO | WO03005512 | 1/2003 |

OTHER PUBLICATIONS

Alexander et al., Passive Equalization of Semiconductor Diode Laser Frequency Modulation, Journal of Lightwave Technology, Jan. 1989, 11-23, vol. 7, No. 1.

Binder, J. et al., 10 Gbit/s-Dispersion Optimized Transmission at 1.55 um Wavelength on Standard Single Mode Fiber, IEEE Photonics Technology Letters, Apr. 1994, 558-560, vol. 6, No. 4.

CN 200580012705.4, Mar. 29, 2010, Office Action.

CN 200580015245.0, Sep. 25, 2009, Office Action.

CN 200580015245.0, Mar. 29, 2010, Office Action.

CN 200880009551.7, Jul. 14, 2010, Office Action.

EP 05731268.8, Jan. 16, 2008, Office Action.

EP 05731268.8, May 12, 2010, Office Action.

KR 102008-7027139, Apr. 28, 2010, Office Action.

JP 2009-504345, Apr. 27, 2010, Office Action.

JP2004-551835, Jul. 18, 2008, Office Action.

JP2004-551835, Mar. 2, 2010, Office Action.

CN 200380108289.9, Nov. 23, 2007, Office Action.

CN 200380108289.9, Aug. 29, 2008, Office Action.

CN 200380108289.9, Nov. 21, 2008, Office Action.

CA 2510352, Mar. 17, 2010, Office Action.

Chang-Hee Lee et al, Transmission of Directly Modulated 2.5—Gb/s Signals Over 250 km of Nondispersion-Shifted Fiber by Using a Spectral Filtering Method, IEEE Photonics Technology Letters, vol. 8, No. 12 Dec. 1996 pp. 1725-7127.

Dischler, Roman, Buchali, Fred, Experimental Assessment of a Direct Detection Optical OFDM System Targeting 10Gb/s and Beyond, Optical Fiber Communication/National Fiber Optic Engineers Conference, Feb. 24-28, 3 pages, San Diego, CA.

Hyryniewicz, J.V., et al., Higher Order Filter Response in Coupled Microring Resonators, IEEE Photonics Technology Letters, Mar. 2000, 320-322, vol. 12, No. 3.

Kikuchi, Nobuhiko, et al., Experimental Demonstration of Incoherent Optical Multilevel Staggered-APSK (Amplitude- and Phase-Shift Keying) Signaling, Optical Fiber Communication/National Fiber Optic Engineers Conference, Feb. 24-28, 2008, 3 pages, San Diego, CA.

Kiyoshi Fukuchi, Proposal and Feasibility Study of a 6-level PSK modulation format based system for 100 Gg/s migration, 2007, 3 pages.

Koch, T. L. et al., Nature of Wavelength Chirping in Directly Modulated Semiconductor Lasers, Electronics Letters, Dec. 6, 1984, 1038-1039, vol. 20, No. 25/26.

Kurtzke, C., et al., Impact of Residual Amplitude Modulation on the Performance of Dispersion-Supported and Dispersion-Mediated Nonlinearity-Enhanced Transmission, Electronics Letters, Jun. 9, 1994, 988, vol. 30, No. 12.

Lammert et al., MQW DBR Lasers with Monolithically Integrated External-Cavity Electroabsorption Modulators Fabricated Without Modification of the Active Region, IEEE Photonics Technology Letters, vol. 9, No. 5, May 1997, pp. 566-568.

Li, Yuan P., et al., Chapter 8: Silicon Optical Bench Waveguide Technology, Optical Fiber Communications, 1997, 319-370, vol. 111B, Lucent Technologies, New York.

Little, Brent E., Advances in Microring Resonators, Integrated Photonics Research Conference 2003.

Mahgerefteh, D. and Fan, F., Chirp-managed-laser technology delivers > 250-km reach, Lightwave Online, 2005, PennWell Corporation. Accessed online Jul. 1, 2009 at: http://www.finisar.com/download_31wMeaCML_Application%20White%20Paper-LW.pdf.

Mohrdiek, S. et al., 10-Gb/s Standard Fiber Transmission Using Directly Modulated 1.55-um Quantum-Well DFB Lasers, IEEE Photonics Technology Letters, Nov. 1995, 1357-1359, vol. 7, No. 11.

Morton, P.A. et al., "38.5km error free transmission at 10Gbit/s in standard fibre using a low chirp, spectrally filtered, directly modulated 1.55um DFB laser", Electronics Letters, Feb. 13, 1997, vol. 33(4).

Prokais, John G., Digital Communications, 2001, 202-207, Fourth Edition, McGraw Hill, New York.

Rasmussen, C.J., et al., Optimum Amplitude and Frequency-Modulation in an Optical Communication System Based on Dispersion Supported Transmission, Electronics Letters, Apr. 27, 1995, 746, vol. 31, No. 9.

Ronald Freund, Dirk Daniel Gross, Matthias Seimetz, Lutz Molle, Christoph Casper, 30 Gbit/s RZ 8-PSK Transmission over 2800 km Standard Single Mode Fibre without Inline Dispersion Compensation, 2007, 3 pages.

Shalom, Hamutal et al., On the Various Time Constants of Wavelength Changes of a DFB Laser Under Direct Modulation, IEEE Journal of Quantum Electronics, Oct. 1998, pp. 1816-1822, vol. 34, No. 10.

Tokle, Torger et al., Advanced Modulation Formats for Transmission Systems, Optical Fiber Communication/National Fiber Optic Engineers Conference, Feb. 24-28, 2008, 3 pages, San Diego, CA.

Wedding, B., Analysis of fibre transfer function and determination of receiver frequency response for dispersion supported transmission, Electronics Letters, Jan. 6, 1994, 58-59, vol. 30, No. 1.

Wedding, B., et al., 10-Gb/s Optical Transmission up to 253 km Via Standard Single-Mode Fiber Using the Method of Dispersion-Supported Transmission, Journal of Lightwave Technology, Oct. 1994, 1720, vol. 12, No. 10.

Yu, et al., Optimization of the Frequency Response of a Semiconductor Optical Amplifier Wavelength Converter Using a Fiber Bragg Grating, Journal of Lightwave Technology, Feb. 1999, 308-315, vol. 17, No. 2.

Corvini, P.J. et al., Computer Simulation of High-Bit-Rate Optical Fiber Transmission Using Single-Frequency Lasers, Journal of Lightwave Technology, Nov. 1987, 1591-1596, vol. LT-5, No. 11.

Matsui, Yasuhiro et al, Chirp-Managed Directly Modulated Laser (CML), IEEE Photonics Technology Letters, Jan. 15, 2006, pp. 385-387, vol. 18, No. 2.

Nakahara, K. et al, 40-Gb/s Direct Modulation With High Extinction Ratio Operation of 1.34-μm InGaAlAs Multiquantum Well Ridge Waveguide Distributed Feedback Lasers, IEEE Photonics Technology Letters, Oct. 1, 2007, pp. 1436-1438, vol. 19 No. 19.

Sekine, Kenro, et al., Advanced Multi-level Transmission Systems, Optical Fiber Communication/National Fiber Optic Engineers Conference, Feb. 24-28, 2008, 3 pages, San Diego, CA.

Sato, K. et al, Chirp Characteristics of 40-Gb/s Directly Modulated Distributed-Feedback Laser Diodes, Journal of Lightwave Technology, Nov. 2005, pp. 3790-3797, vol. 23, No. 11.

U.S. Appl. No. 11/964,315, filed Aug. 25, 2010, Office Action.
U.S. Appl. No. 11/964,321, filed Aug. 25, 2010, Office Action.
U.S. Appl. No. 12/115,337, filed Mar. 4, 2010, Office Action.
U.S. Appl. No. 12/115,337, filed Aug. 20, 2010, Office Action.
U.S. Appl. No. 12/047,017, filed Jun. 1, 2010, Restriction Requirement.
U.S. Appl. No. 12/047,017, filed Aug. 6, 2010, Office Action.
U.S. Appl. No. 12/053,344, filed Sep. 3, 2010, Notice of Allowance.

Mahgerefteh et al., Chirp managed laser (CML): A compact transmitter for dispersion tolerant 10 Gb/s networking applications; Optical Fiber Communication Conference, 2006 and the 2006 National Fiber Optic Engineers Conference. OFC 2006, Mar. 5-10, 2006; Digital Object Identifier: 10.1109/OFC.2006.215459.

Wesstrom et al., State-of-the-art performance of widely tunable modulated grating Y-branch lasers; Optical Fiber Communication Conference, 2004. OFC 2004, vol. 1, No., pp. 2 vol. (1800), Feb. 23-27, 2004; doi: 10.1109/OFC.2004.1349295.

JP 2009-504345, Oct. 26, 2010, Office Action.

U.S. Appl. No. 12/014,676, filed Oct. 4, 2010, Office Action.
U.S. Appl. No. 12/017,957, filed Nov. 5, 201, Office Action.
U.S. Appl. No. 12/025,573, filed Oct. 6, 2010, Office Action.
U.S. Appl. No. 12/028,678, filed Dec. 8, 2010, Office Action.
U.S. Appl. No. 12/047,017, filed Sep. 27, 2010, Notice of Allowance.
U.S. Appl. No. 12/053,344, filed Apr. 1, 2010, Office Action.
U.S. Appl. No. 12/115,337, filed Oct. 28, 2010, Notice of Allowance.
U.S. Appl. No. 12/184,137, filed Dec. 2, 2010, Notice of Allowance.
200380108289.9, CN, Nov. 2007, Office Action.
05731268.8, EP, Jan. 2008, Office Action.
200380108289.9, Aug. 2008, Office Action.
05764209.2, EP, Jun. 2009, Exam Report.
200580015245.0, CN, Sep. 2009, Office Action.
200580012705.4, CN, Mar. 2010, Office Action.
200580015245.0, CN, Mar. 2010, Office Action.
2510352, CA, Mar. 2010, Office Action.
102008-7027139, KR, Apr. 2010, Office Action.
05731268.8, EP, May 2010, Office Action.
200580037807, CN, May 2010, Office Action.
200880009551.7, CN, Jul. 2010, Office Action.
2004-551835, JP, Jul. 2008, Office Action.
200380108289.9, CN, Nov. 2008, Office Action.
JP 2004-551835, Mar. 2010, Office Action.
JP 2009-504345, Apr. 2010, Office Action.
JP 2009-504345, Oct. 2010, Office Action.

Lammert et al., MQW DBR Lasers with Monolithography Integrated External-Cavity Electroabsorption Modulators Fabricated Without Modification of the Active Region, IEEE Photonics Technology Letters, val. 9, No. 5, May 1997, pp. 566-568.

Ronald Freund, Dirk Daniel Gross, Matihias Seimetz, Lutz Molle, Christoph Casper, 30 Gbit/s RZ 8-PSK Transmission over 2800 km Standard Single Mode Fibre without Inline Dispersion Compensation, 2007, 3 pages.

Binder, J. et al., 10 Gbit/s-Dispersion Optimized Transmission at 1.55 urn Wavelength on Standard Single Mode Fiber, IEEE Photonics Technology Letters, Apr. 1994, 558-560, vol. 6, No. 4.

Kurtzke, C., et al., Impact of Residual Amplitude Modulation on the Performance of Dispersion-Supported and Dispersion-Mediated Nonlinearity-Enhanced Transmission, Electronics Letters, Jun. 9, 1994, 988, vol. 30, No. 12.

Shalom, Hamutali et al., On the Various Time Constants of Wavelength Changes of a DFB Laser Under Direct Modulation, IEEE Journal of Quantum Electronics, Oct. 1998, pp. 1816-1822, vol. 34, No. 10.

Corvini, P.J. et al., Computer Simulation of High-Bit-Rate Optical Fiber Transmission Using Single-Frequency Lasers, Journal of Lightwave Technology, Nov. 1987, 1591-1596, vol. LT-5, No. 11.

Lee, Chang-Hee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.

U.S. Appl. No. 12/028,675, filed Oct. 27, 2010, Office Action.

* cited by examiner

FIG. 4

WDM PON BASED ON DML

CROSS-REFERENCE TO RELATED APPLICATIONS

The present application claims the benefit of priority of U.S. Provisional Patent Application Ser. No. 60/900,383, entitled WDM PON BASED ON CML, filed Feb. 8, 2007, and fully incorporated herein by reference in its entirety.

BACKGROUND OF THE INVENTION

1. The Field of the Invention

The present invention relates generally to wavelength division multiplexing ("WDM") passive optical network ("PON") systems. More particularly, embodiments of the invention relate to WDM PON systems using Fabry-Perot ("FP") lasers seeded by continuous wave ("CW") light from a central office to obtain single-mode operation and extend link distance.

2. The Relevant Technology

A passive optical network is a fiber-to-the-premises network architecture in which one or more passive optical devices are used to enable point to multipoint topologies. A PON configuration reduces the amount of fiber and central office equipment required compared with point-to-point architectures.

A typical WDM PON has a subscriber network architecture that forms a tree-type distribution topology. A central office is coupled over one fiber to a remote node for dividing a downstream optical signal received from the central office into multiple signals. The remote node than transmits the multiples signals to the respective subscriber units over independent fibers. Multiple upstream optical signals from the subscriber units are combined by the remote node before being transmitted to the central office over a single upstream fiber.

WDM PON systems offer the potential of large capacity, network security, and upgradability. However, these networks require low-cost optical signal sources at the central office and/or subscriber units. One conventional optical signal source implemented in WDM PON systems is the FP laser. The FP laser has a simple structure and is uncomplicated in operation, offering a significant cost advantage over other optical signal sources. However, multi-mode oscillation limits the transmission distance of FP lasers to less than 5 kilometers. As a result, low-cost FP lasers are unsuitable for emerging WDM PON systems requiring 10 Gigabit per second ("Gb/s") data rates and signal transmission over 10 to 20 kilometers.

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY OF THE INVENTION

These and other limitations are overcome by embodiments of the invention, which relate to systems and methods for implementing FP lasers in single-mode operation for data transmission in WDM PON systems. An example WDM PON system includes a central office and one or more subscriber units. According to one embodiment of the invention, an FP laser is employed for an upstream link at a subscriber unit. The FP laser is a slave laser injection seeded by CW seed light delivered from the central office. The source of the CW seed light may comprise, for instance, a distributed feedback ("DFB") seed laser, amplified spontaneous emission sources ("ASEs") from semiconductor optical amplifiers ("SOAs"), super continuum, or the like. Advantageously, injection seeding of the FP slave laser enables single-mode operation of the FP laser.

At the central office on the receiving end of the upstream link, an optical spectrum reshaper ("OSR") is positioned in front of a corresponding optical receiver. The optical spectrum reshaper may comprise an optical bandpass filter having a transmission edge slope optimized for enhancing an optical data signal received from the FP laser. In one embodiment, the CW seeding light is wavelength locked to the slope of the optical bandpass filter, which also locks the wavelength of the FP slave laser.

The FP slave laser is directly modulated to generate an optical data signal that is both frequency modulated and amplitude modulated. Upon passing through the optical spectrum reshaper at the receiving end of the upstream link, the resulting optical data signal is converted to a substantially amplitude modulated signal. In particular, the frequency modulation of the optical data signal and the characteristics of the optical spectrum reshaper are such that the extinction ratio of the resulting optical data signal is increased. The optical spectrum reshaper may further operate to generate vestigial sideband.

In one embodiment, the central office further includes a wavelength locker. The wavelength locker determines the wavelength of the received optical data signal and stabilizes the wavelength of the DFB seed laser by adjusting the DFB seed laser wavelength up or down as needed, which in turn adjusts the wavelength of the FP slave laser.

Advantageously, injection seeding the FP laser in an upstream link and implementing an optical spectrum reshaper at the receiving end of the upstream link enables single-mode operation of the laser and improves the transmission distance of the upstream link up to 200 kilometers in the C and L bands.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention generally relate to an optical communication system for use in a WDM PON system. The optical communication system according to embodiments of the invention implements FP or other slave lasers and OSRs for extended signal transmission. In one embodiment, the optical communication system includes one or more DFB lasers implemented as seed lasers in a central office of the WDM PON system, while FP lasers are implemented in upstream links at subscriber units or remote nodes of the WDM PON system as slave lasers. Optical receivers implemented at the central office complete the upstream link, with OSRs positioned in front of the receivers to generate vestigial sidebands and enhance extinction ratios of the optical signals received from the injection-seeded slave lasers. Wavelength lockers can be implemented to stabilize the wavelength of the seed lasers and slave lasers, although they are not required in all embodiments. Advantageously, the use of OSRs in front of the optical receivers can improve transmission distances for FP lasers up to 200 kilometers for 10 Gb/s data rates.

Embodiments of the present invention can be implemented in various optoelectronic devices. As used herein, the term "optoelectronic device" includes devices having both optical and electrical components. Examples of optoelectronic devices include, but are not limited to transponders, transceivers, transmitters, and/or receivers. Optoelectronic devices can be used, for instance, in telecommunications networks, local area networks, metro area networks, storage area networks, wide area networks, and the like. The principles of the present invention may be implemented in optoelectronic devices of any form factor currently available or that may be developed in the future, including SFF, SFP, SFP+, XFP, X2, and 300-pin, without restriction. It will be appreciated, however, that the optoelectronic devices need not comply with standardized form factor requirements and may have any size or configuration necessary according to a particular design. The principles of the present invention are suitable for 1 G, 2 G, 4 G, 10 G and higher bandwidth fiber channels.

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

Figure 1:
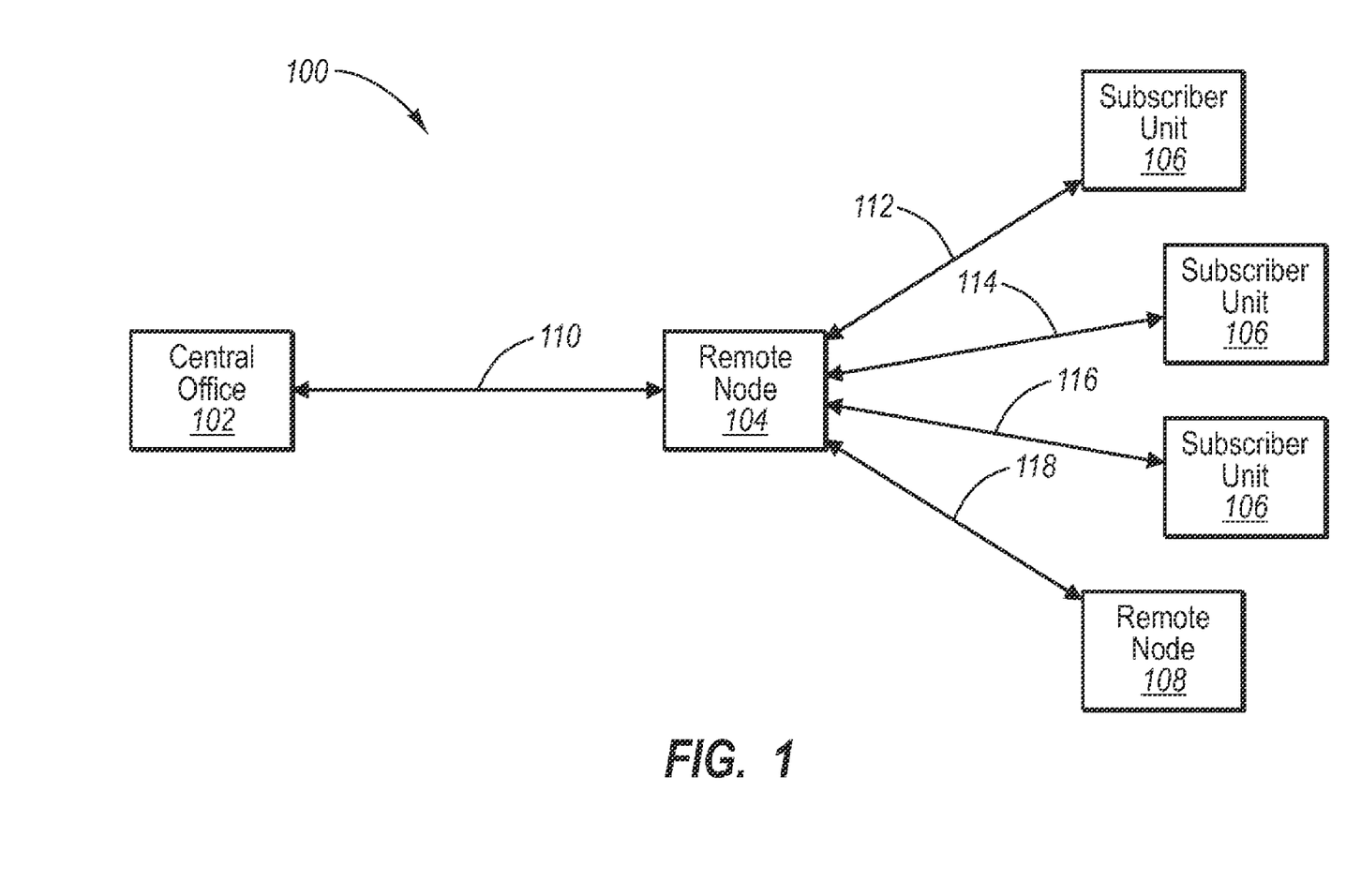
FIG. 1 illustrates one embodiment of an example WDM PON system in which embodiments of the invention can be implemented.

FIG. 1 schematically illustrates one embodiment of a WDM PON system 100 in which embodiments of the invention can be implemented. The WDM PON system 100 includes a central office 102, a remote node 104, and a plurality of subscriber units 106. The remote node 104 may optionally be coupled to a second remote node 108 for providing optical signals to another group of subscriber units (not shown). The central office 102, remote node 104, plurality of subscriber units 106, and optional remote node 108 are interconnected by communication links 110, 112, 114, 116, 118 (collectively referred to hereinafter as "links 110-118"). Each of the communication links 110-118 may include a single bidirectional optical fiber or two or more unidirectional and/or bidirectional optical fibers facilitating bidirectional communication between the central office 102, remote node 104, subscribers 106, and optional remote node 108.

In the WDM PON system 100, the central office 102 includes a plurality of transmitters for communicating with the subscriber units 106 on specific assigned wavelengths. The signals emitted by the transmitters are multiplexed and transmitted over the link 110 to the remote node 104 where they are demultiplexed into separate signals. Each of the separate signals is transmitted over the corresponding link 112, 114, 116, 118 to the corresponding subscriber unit 106 or remote node 108. The subscriber units 106 include receivers for converting the received light signal to an electrical signal. The signals and/or information conveyed from the central office through the remote node to the subscriber units 106 are referred to herein as the "downlink" or "downstream link".

Each of the subscribers 106 includes a transmitter for communicating with the central office using a specific assigned wavelength. Signals emitted by the transmitters of the subscribers 106 are transmitted to the remote node 104 and multiplexed onto the fiber 110. The multiplexed signal is transmitted to the central office 102 where it is demultiplexed into multiple separate signals and converted to electrical signals by corresponding receivers in the central office 102. The signals and/or information conveyed from the subscribers to the central office are referred to herein as the "uplink" or "upstream link".

Figure 2:
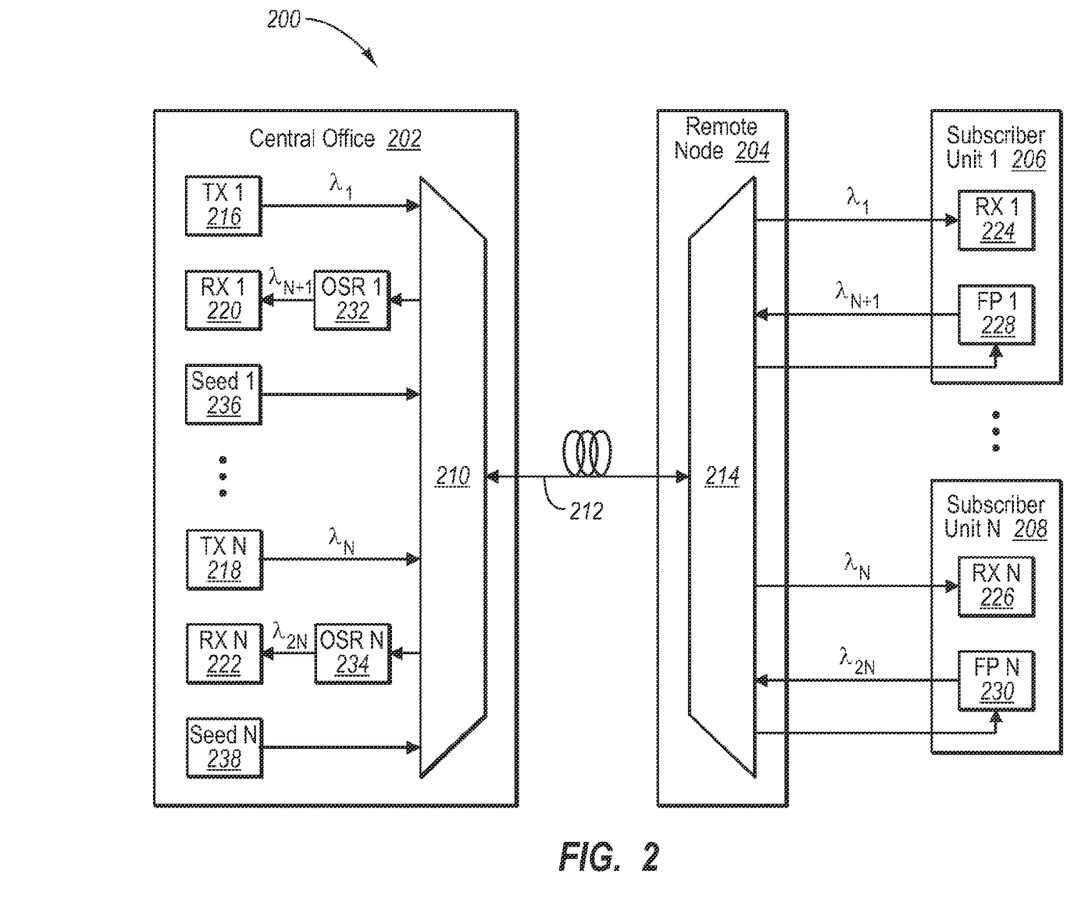
FIG. 2 depicts additional aspects regarding an example WDM PON system implementing low-cost FP lasers for upstream links.

With additional reference to FIG. 2, one embodiment 200 of the WDM PON system 100 of FIG. 1 is depicted, further illustrating an optical communication system according to embodiments of the invention. Briefly, an optical communication system according to embodiments of the invention may include one or more slave lasers, one or more seed lasers, one or more optical spectrum reshapers, and optionally one or more wavelength lockers and/or one or more of the components of the WDM PON system. As in FIG. 1, the WDM PON system 200 includes a central office 202, remote node 204, and a plurality of subscriber units 206, 208.

The central office 202 includes a plurality of optical transmitters 216, 218 for outputting downstream optical signals that are transmitted to the subscriber units 206, 208, a multiplexer/demultiplexer ("mux/demux") 210, a plurality of optical receivers 220, 222, and a plurality of optical spectrum reshapers ("OSRs") 232, 234. Each of the subscriber units 206, 208 performs two-way communication with the central office 202 using specific assigned wavelengths. The use of specific assigned wavelengths ensures confidential communication and allows the WDM PON system 200 to be easily extended.

The optical transmitters 216, 218 of the central office 202 output downstream optical signals having a range of wavelengths $\lambda_1$-$\lambda_N$ to the mux/demux 210. The mux/demux 210 multiplexes the downstream optical signals and then outputs the multiplexed downstream optical signals to the remote node 204. The remote node 204 includes a demux/mux 214 that demultiplexes the downstream optical signals in order to provide separate optical signals to the subscribers 206, 208. Each of the mux/demux 210 and demux/mux 214 may comprise, for instance, an array waveguide grating ("AWG") or the like. Each of the subscriber units 206, 208 includes an optical receiver/detector 224, 226 that converts a received downstream optical signal to an electrical signal.

The subscriber units 206, 208 further include optical transmitters 228, 230, each configured to emit upstream optical signals at a specific wavelength assigned to the subscriber unit, ranging from $\lambda_{N+1}$-$\lambda_{2N}$. The upstream optical signals from the subscriber units 206, 208 are multiplexed by the demux/mux 214 onto optical link 212. At the central office 202, upstream multiplexed optical signals are demultiplexed by the mux/demux 210 and ultimately converted to electrical signals by optical receivers 220, 222.

To lower hardware costs associated with the WDM PON system 200 and/or provide additional advantages, the WDM PON system 200 implements an optical communication system based on Chirp Managed Laser CML™ technology that enables the use of low cost FP semiconductor lasers and increases the link distance over which optical signals can be transmitted compared to a conventional WDM PON system. Basically, CML™ technology involves the use of an OSR to convert a frequency modulated signal of a directly modulated transmitter to a substantially amplitude modulated signal. The OSR additionally introduces phase correlation between the bits of the signal. To perform these functions, the slope of the OSR is attuned to the transmission wavelength of the directly modulated transmitter. In particular, the OSR is a filter (such as an optical bandpass filter) with a transmission window configured to discriminate between blue-shifted 1 bits and red-shifted 0 bits, transmitting 1 bits with little or no loss while attenuating 0 bits to increase the extinction ratio of a signal. A more in-depth explanation of CML™ technology is disclosed in U.S. patent application Ser. No. 10/289,944, filed Nov. 6, 2002, and entitled POWER SOURCE FOR A DISPERSION COMPENSATION FIBER OPTIC SYSTEM, which application is herein incorporated by reference in its entirety.

Accordingly, embodiments of an optical communication system based on CML™ technology include one or more OSRs 232, 234. Embodiments of the optical communication system additionally include the one or more slave transmitters 228, 230 of the subscriber units 206, 208 and one or more master/seed lasers or optical signal sources 236, 238 for injection seeding the transmitters 228, 230. As shown, the master transmitters 236, 238 may comprise, for instance, DFB lasers configured to emit CW light signals, while the transmitters 228, 230 comprise FP lasers configured to operate as slave transmitters to the master transmitters 236, 238. While illustrated with multiple seed lasers 236, 238 (e.g., one for each slave laser 228, 230), the system 200 may alternately include a single seed laser adapted to produce a broadband signal that can be spectrum sliced (e.g., at the AWG 214) to produce multiple narrowband signals for separately seeding the slave lasers 228, 230.

Basically, the master/seed transmitters 236, 238 emit CW light signals that are multiplexed over the link 212 and separated at the remote node 204 before being used to injection seed the FP slave lasers 228, 230. The CW light signals dictate the optical frequency and phase of light signals emitted by the FP slave lasers 228, 230. As a result, the FP slave lasers 228, 230 can be rapidly modulated (e.g., at 10 Gb/s or higher data rates) and still operate in single-mode operation. The signals emitted by the FP slave lasers 228, 230 are transmitted to the remote node 204, multiplexed over the link 212, and then demultiplexed at the central office 202 before passing through OSRs 232, 234. The OSRs reshape the optical signals and provide the reshaped optical signals to the optical receivers 220, 222.

In one embodiment of the invention, the wavelength of the light signal emitted by each of the seed transmitters 236, 238 and transmitted downstream to the FP lasers 228, 230 is the same as the wavelength of the corresponding modulated light signal emitted by each of the FP lasers 228, 230. In this case and/or in others, the CW lights signals from the seed transmitters 236, 238 may be transmitted downstream over one or more different optical fibers than the modulated light signals transmitted upstream from the FP lasers 228, 230. For instance, within link 212, downstream CW light signals may be multiplexed over a first optical fiber while upstream modulated light signals are multiplexed over a second optical fiber. Downstream modulated light signals from the transmitters 216, 218 may be multiplexed over the same optical fiber as the downstream CW light signals, the upstream modulated light signals, or over a third optical fiber.

Figure 3:
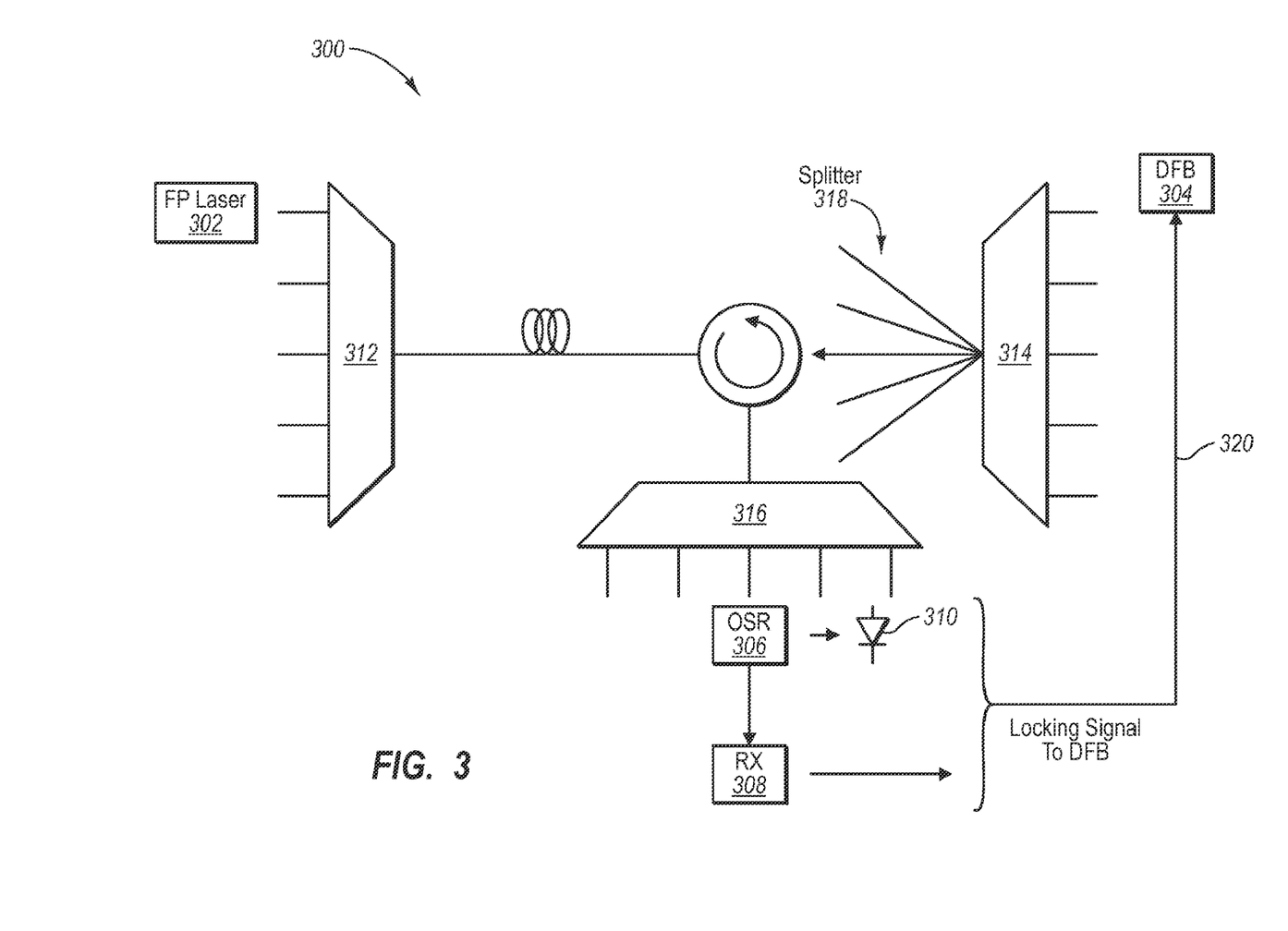
FIG. 3 illustrates one embodiment of an optical communication system configured to enable use of FP lasers for upstream links in a WDM PON system.

With additional reference to FIG. 3, one embodiment of an optical communication system based on CML™ technology is illustrated further at 300. The optical communication system 300 includes an FP slave laser 302 (corresponding to optical transmitter 228 or 230 of FIG. 2), a DFB seed/master laser 304 (corresponding to master transmitter 236 or 238), and an OSR 306 (corresponding to OSR 232 or 234). The optical communication system 300 can optionally include an optical receiver 308 (corresponding to optical receiver 220 or 222), monitor photodiode 310, and one or more muxes/demuxes 312, 314, 316, and splitters 318, which may correspond in whole or in part to the mux/demux 210 and demux/mux 214 of FIG. 2.

In operation, the FP slave laser 302 is implemented for the upstream link at a subscriber unit. The FP laser 302 is injection seeded by CW light delivered from seed laser 304 (e.g., at a central office) in order to achieve single-mode operation. In this manner, the FP laser 302 can be directly modulated while still generating a single-mode optical signal.

Direct modulation of a semiconductor laser (such as an FP laser) results in frequency modulation of the emitted optical signal, also known as "chirp." Two main types of chirp are generated by a directly modulated semiconductor laser: transient chirp and adiabatic chirp. Transient chirp has a short-term damped oscillatory behavior and occurs at 1-to-0 and 0-to-1 bit transitions. Transient chirp is usually undesirable but can be controlled to manageable levels through proper biasing of the laser. Adiabatic chirp is proportional to optical intensity, causing 1 bits to be blue-shifted relative to 0 bits. While undesirable in many instances, adiabatic chirp can be managed using the OSR 306, and in fact is central to implementing CML™ technology.

As indicated above, the OSR 306 converts the frequency modulated signal of the laser 302 to an amplitude modulated signal. In particular, the OSR 306 enhances the extinction ratio of the FP laser's emitted optical signal before it reaches the optical receiver 308 by transmitting blue-shifted 1 bits with little or no loss while attenuating red-shifted 0 bits to increase the extinction ratio of the signal. One skilled in the art will appreciate, with the benefit of the present disclosure, that the transmission window of the OSR 306 can be configured or attuned for a particular wavelength. Consequently, a properly configured OSR can be implemented in a WDM PON system on each wavelength channel.

In addition to enhancing the extinction ratio of the received optical signal, the OSR 306 generates vestigial sideband.

In order to ensure that the FP laser 302 operates at a specific assigned wavelength to avoid interfering with other signals in a WDM PON system, the optical communication system 300 additionally includes one or more monitor photodiodes 310 to provide wavelength locking capability. In one embodiment, the OSR 306 includes a periodic structure that operates in conjunction with the one or more monitor photodiodes 310 as a wavelength locker. Briefly, the wavelength locker can be used to measure the wavelength of the received optical signal after which a feedback loop 320 can be used to adjust the wavelength of the seed light emitted by the master laser 304 up or down as needed. Because the characteristics of the seed light determine the characteristics of the light signal emitted by the FP laser 302, any wavelength adjustment to the seed light in turn adjusts the wavelength of the light signal emitted by the FP laser 302.

As previously indicated above, the master/seed lasers 236, 238, 304 of FIGS. 2 and 3 may be DFB lasers. In this case, the FP lasers at the subscriber units will lase at the same wavelength as the DFB lasers. Alternately or additionally, the seed lasers 236, 238, 304 may include ASE sources. ASE sources include superluminescent diode ("SLD")-based broadband light sources, ASE sources from semiconductor optical amplifiers ("SOAs") including master oscillator power amplifier ("MOPA") type high power SOAs, ASE sources from erbium-doped fiber amplifiers ("EDFAs"), ASE sources from super continuum (e.g., using non-linear compression of short pulse in highly nonlinear fiber, such as photonic crystal fibers), and the like or any combination thereof.

When implementing an ASE source as a seed laser, the emitted seed light has a broad spectrum. In this case, the seed light from a single ASE source can be spectrum-sliced at the AWG 214, 312 of the remote node such that each of the separate spectral components can be used to seed a different FP slave laser at the subscriber units. The benefit of an ASE source over a DFB laser for seeding is that the wavelength of the FP laser can be chosen according to the AWG filtering of the broad ASE spectrum. Thus, when an ASE source is implemented, there is no need to implement wavelength locking as well.

Figure 4:
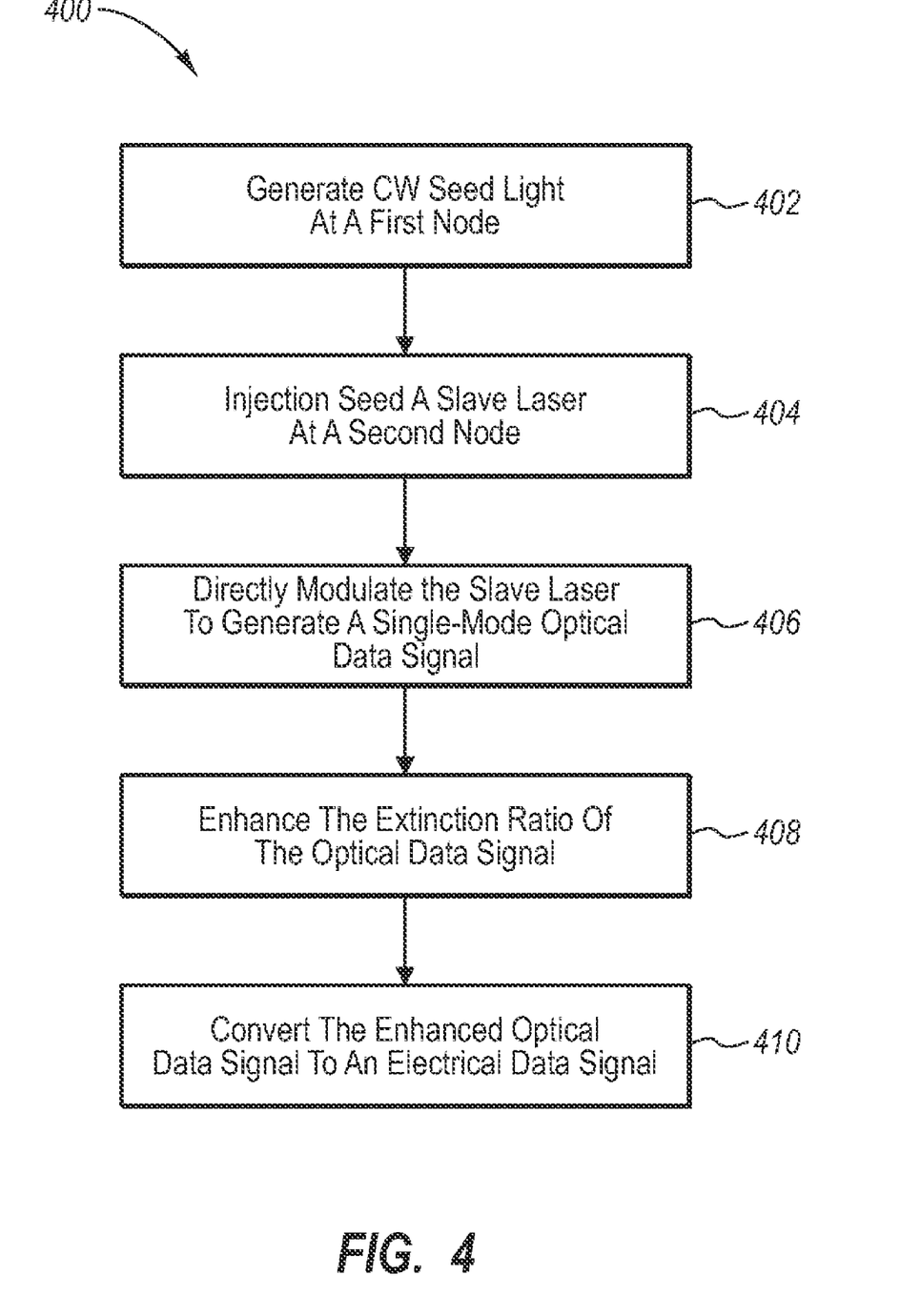
FIG. 4 is a flow chart depicting an example method for operating an optical communication system according to embodiments of the invention.

With additional reference to FIG. 4, one embodiment of a method 400 for operating an optical communication system is illustrated. The method 400 begins by generating 402 CW seed light using a seed laser at a first network node (e.g., at a central office). The seed laser may comprise a DFB laser, an ASE source, or the like. The CW seed light is injection seeded 404 into a slave laser at a second network node (e.g., a subscriber unit). By injection seeding the slave laser with a CW light signal, the slave laser can be directly modulated 406 with an electrical data signal to generate a single-mode optical data signal with the same wavelength as the CW light signal that can be transmitted back to the first network node.

At the first network node, the extinction ratio of the optical data signal is enhanced 408 using an OSR positioned in front of an optical receiver of the first network node. The optical receiver may comprise, for instance, a photodetector, a photodiode, and the like or any combination thereof. Enhancing 408 the extinction ratio of the optical data signal may include discriminating between 1 bits and 0 bits of the optical data signal and/or converting the optical data signal from a frequency modulated signal to a substantially amplitude modulated signal.

The method 400 continues by converting 410 the enhanced optical data signal into an electrical data signal using the optical receiver. Optionally, the method 400 may additionally include one or more of: generating a vestigial sideband from the optical data signal using the OSR, stabilizing the wavelength of the seed laser and the slave laser using a wavelength locker, and the like or any combination thereof.

Advantageously, injection seeding of FP lasers with CW light enables single-mode operation of the FP lasers. Additionally, single-mode operation of an FP laser, in conjunction with an OSR positioned in front of a corresponding detector, further enables long-range operation of the FP laser by, among other things, enhancing the light signal of the FP laser at the receiving end of the corresponding optical link. For instance, multi-mode oscillations in non injection-seeded FP lasers limits their transmission distance to less than 5 kilometers at 10 Gb/s. However, injection-seeded FP lasers are suitable for 10 Gb/s optical links of 10 to 20 kilometers or longer when used in conjunction with OSRs at the receiving end of the links. Moreover, the simple structure and operation principle of FP lasers provides a significant cost advantage in WDM PON systems implementing FP lasers compared to conventional directly modulated transmitters.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical communication system comprising:
    a master optical signal source configured to produce a seed optical signal;
    a slave optical signal source configured to be injection seeded by the seed optical signal and adapted to receive a modulation signal and produce a first optical data signal, the first optical data signal being frequency modulated; and
    an optical spectrum reshaper adapted to reshape the first optical data signal into a second optical data signal, the second optical data signal being substantially amplitude modulated.

2. The optical communication system of claim 1, wherein the master optical signal source includes a distributed feedback laser or an amplified spontaneous emission source.

3. The optical communication system of claim 1, wherein the slave optical signal source comprises a Fabry-Perot laser.

4. The optical communication system of claim 1, wherein the master optical signal source and the optical spectrum reshaper are located within a central office of a wavelength division multiplexing passive optical network and the slave optical signal source is located within a subscriber unit.

5. The optical communication system of claim 4, wherein a distance traveled by the first optical data signal from the slave optical signal source to the optical spectrum reshaper is between ten and twenty kilometers.

6. The optical communication system of claim 4, wherein a distance traveled by the first optical data signal from the slave optical signal source to the optical spectrum reshaper is between twenty and two-hundred kilometers.

7. The optical communication system of claim 1, further comprising one or more monitor photodiodes configured to wavelength lock wavelengths of the optical signals emitted by the master optical signal source and the slave optical signal source to a particular wavelength.

8. An optical communication system for use in a wavelength division multiplexing passive optical network, comprising:
    a seed optical light source at a first network node and adapted to produce a seed optical signal;
    a slave optical light source at a second network node adapted to be injection seeded by the seed optical signal and adapted to generate an optical data signal representative of an electrical data signal using the seed optical signal and the electrical data signal, the optical data signal being frequency modulated;
    an optical spectrum reshaper at the first network node adapted to convert the frequency modulated optical data signal into a substantially amplitude modulated optical data signal; and
    an optical receiver at the first network node configured to convert the substantially amplitude modulated optical data signal to an electrical data signal.

9. The optical communication system of claim 8, wherein the optical data signal includes blue-shifted 1 bits and red-shifted 0 bits and wherein the optical spectrum reshaper comprises an optical bandpass filter with a transmission window configured to discriminate between the blue shifted 1 bits and the red-shifted 0 bits to convert the frequency modulated optical data signal into a substantially amplitude modulated optical data signal.

10. The optical communication system of claim 8, wherein the slave optical light source comprises a Fabry-Perot laser, and wherein injection seeding of the Fabry-Perot laser enables single-mode operation of the Fabry-Perot laser.

11. The optical communication system of claim 8, wherein the seed optical light source comprises a distributed feedback laser adapted to produce a continuous wave seed optical signal, and wherein a wavelength of the continuous wave seed optical signal determines a wavelength of the frequency modulated optical data signal.

12. The optical communication system of claim 8, wherein the seed optical light source includes an amplified spontaneous emission source adapted to produce a broadband optical signal that includes the seed optical signal, the broadband optical signal being spectrum sliced into the seed optical signal and one or more additional seed optical signals of different wavelengths prior to the seed optical signal injection seeding the slave optical light source.

13. The optical communication system of claim 12, wherein the amplified spontaneous emission source includes one or more of: a superluminescent diode-based broadband light source, a semiconductor optical amplifier, a master oscillator power amplifier-type high power semiconductor optical amplifier, an erbium-doped fiber amplifier, and photonic crystal fibers.

14. The optical communication system of claim 8, wherein the optical spectrum reshaper is further configured to generate a vestigial sideband.

15. A method for operating an optical communication system used in a wavelength division multiplexing passive optical network, comprising:

generating a seed light using a seed laser at a first network node;

injecting the seed light into a slave laser at a second network node;

directly modulating the slave laser to generate a single-mode optical data signal;

enhancing an extinction ratio of the single-mode optical data signal using an optical spectrum reshaper positioned in front of a photodetector at the first network node, wherein the single-mode optical data signal is frequency modulated and wherein enhancing the extinction ratio of the frequency modulated optical signal includes converting the frequency modulated optical data signal to a substantially amplitude modulated optical data signal; and converting the enhanced single-mode optical data signal into an electrical data signal using the photodetector.

16. The method of claim 15, wherein enhancing the extinction ratio of the single-mode optical data signal includes discriminating between 1 bits and 0 bits of the single-mode optical data signal by transmitting 1 bits with little or no loss while attenuating 0 bits to increase the extinction ratio of the single-mode optical data signal.

17. The method of claim 15, further comprising, generating a vestigial sideband signal from the single-mode optical data signal using the optical spectrum reshaper.

18. The method of claim 15, further comprising, stabilizing emission wavelengths of the seed laser and the slave laser using a wavelength locker at the first network node.

19. The method of claim 15, wherein the seed laser comprises a distributed feedback laser and the slave laser comprises a Fabry-Perot laser.

20. The method of claim 15, wherein the first network node comprises a central office of a wavelength division multiplexing passive optical network and the second network node comprises a subscriber unit.

* * * * *